June 8, 1943. S. BERMAN 2,321,355
SURGICAL PROBE FOR LOCATING FOREIGN METAL PARTICLES IN BODY TISSUE
Filed Jan. 15, 1942 2 Sheets-Sheet 1
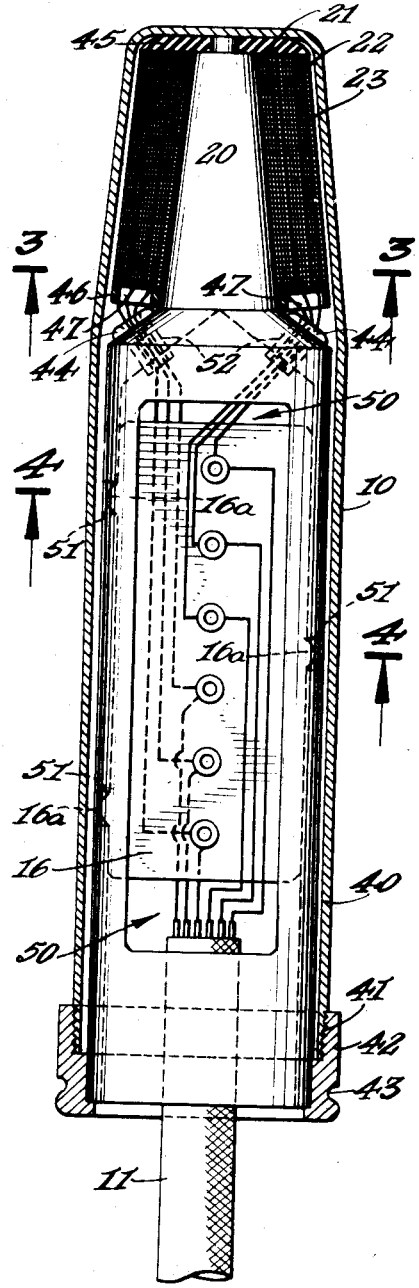
INVENTOR.
SAMUEL BERMAN.
BY Jacob J. Bobrow
ATTORNEY.

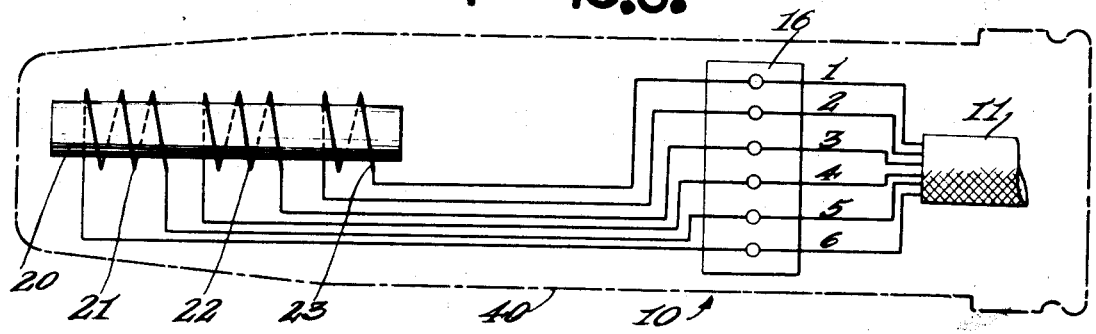
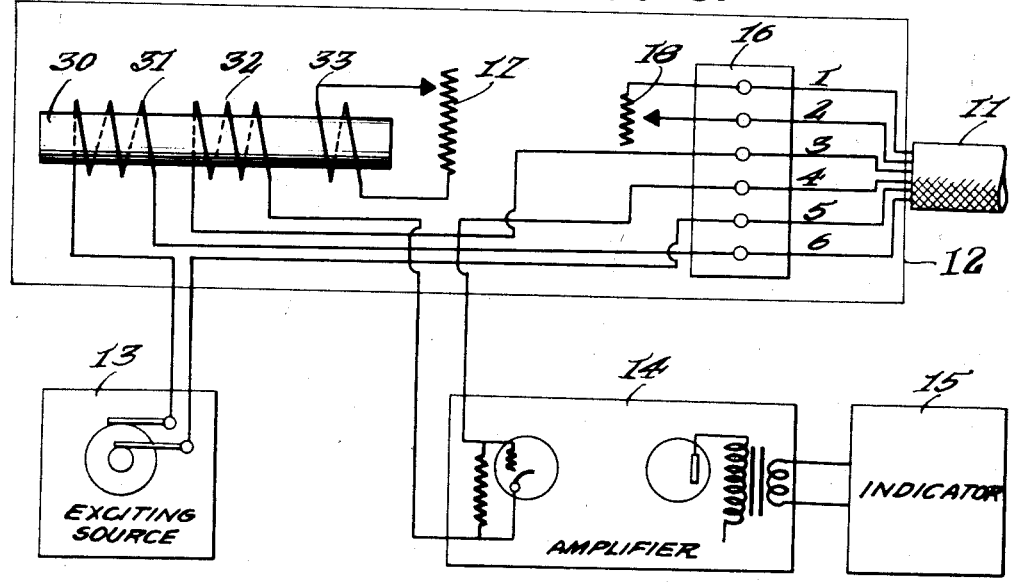
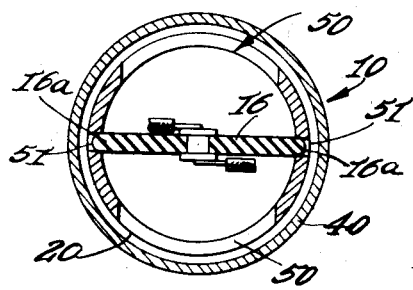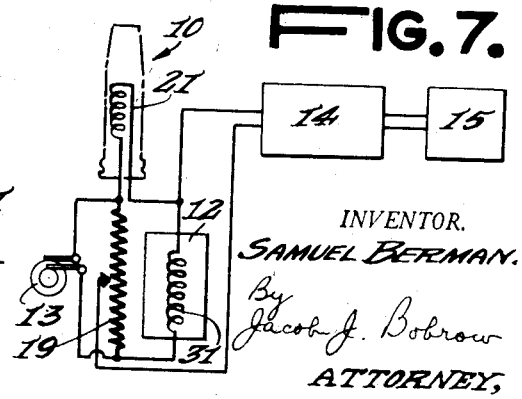

Patented June 8, 1943

2,321,355

UNITED STATES PATENT OFFICE 2,321,355

SURGICAL PROBE FOR LOCATING FOREIGN METAL PARTICLES IN BODY TISSUE

Samuel Berman, Richmond Hill, N. Y., assignor to Waugh Equipment Company, New York, N. Y., a corporation of Maine Application January 15, 1942, Serial No. 426,851

9 Claims. (Cl. 177—311)

My invention relates generally to devices for locating hidden foreign metallic particles in body tissue. More particularly, it relates to a surgical probe, which in conjunction with auxiliary equipment which I employ, is capable of detecting and indicating the location of very small metallic fragments in such tissue.

Location of foreign substances in body tissue is now accomplished primarily by the X-ray. However, the use of X-ray apparatus for the purpose is of limited application because it will not always indicate the position of extremely small foreign metallic particles with sufficient accuracy to permit their removal by surgery. Furthermore, use of X-ray equipment for location of such particles during the actual operation is extremely difficult, and often impossible. This limitation has been found from experience to be very undesirable, as sometimes, a number of explorations within the affected tissue are required to find the particle. Such repeated probings mutilate the tissue even under the best operative practice, and are therefore to be avoided, if possible. My locator can be used during the actual removal operation and because of its greater accuracy in locating particles, it makes possible speedier removal thereof and thus provides the surgeon with a valuable instrument not heretofore available.

While my locator was developed primarily to be useful in cases involving accidental lodgement of metallic particles in body tissue, particularly in industrial accidents, it has fortuitously been tested under actual war conditions at Pearl Harbor, where, I am told, it supplanted the X-ray to a great extent, resulting in speedier and less costly position diagnosis. Some of the present day limitations of the X-ray are the relatively high cost of the plates used, and the time and the expert technique necessary to obtain and interpret them. These objectionable features are eliminated to a considerable degree by use of my device in the location of such foreign metallic particles in body tissue.

To meet the peculiar conditions under which such metallic fragments, often of very small size, are found in such tissue, I have sought to produce a device of extremely high sensitivity of perception so that such small particles may be as readily found as larger ones. I have also borne in mind the high sanitary requirements of modern medicine, and, particularly, the fact that my probe will be used in open wounds and specially made incisions. I have therefore designed my probe so that it is capable of being easily, quickly, and completely sterilized by any of the usual methods used, such as heating, or by steam, or by immersion in or other application of sterilizing agents.

I have also sought to devise a probe as readily usable as any operative tool or instrument, which can be readily grasped and conveniently held by the surgeon, which is of small cross-section and so formed, that it can readily be inserted into relatively small incisions or wounds to facilitate the quick location of the foreign metallic particle, and which can be readily fitted with a sterile covering for itself and the cable as a further sanitary precaution.

When I speak of body tissue, I have in mind, primarily, human tissue, but it is obvious that the veterinarian will find much use for my device in the treatment of injured animals. Other uses for my probe and the compact auxiliary equipment which I have devised will readily suggest themselves.

For a better understanding of the invention, reference may be had to the accompanying drawings in which Fig. 1 is a block diagram showing how my probe is associated with the other elements which I employ for location of foreign metallic particles in body tissue.

Fig. 2 is a cross-sectional view of my probe to indicate the mechanical construction.

Fig. 3 is a sectional view on line 3—3 of Fig. 2.

Fig. 4 is a sectional view on line 4—4 of Fig. 2.

Fig. 5 is a schematic representation of the electrical elements of the probe.

Fig. 6 is a schematic representation of the electrical elements of the balancing means, the exciting source, the amplifier, and the indicator.

Fig. 7 is a schematic representation of a variation of my arrangement showing how my probe can be used with a single winding.

As illustrated in the drawings and particularly in Fig. 1, the locator includes a probe, generally designated 10, connected by a multi-conductor cable 11 to a balancing unit 12, a source of exciting current 13 for the probe 10 and the balancing unit 12, a vacuum tube amplifier 14, and an indicating means 15. The internal construction of the preferred form of probe 10 is shown in Figs. 2, 3, and 4 and the electrical circuits for the probe and associated equipment are shown in Figs. 5 and 6.

Fig. 7 shows a variation of the arrangement shown in Fig. 6.

In the embodiment shown, the vacuum tube amplifier 14 is of conventional high gain type and the indicating means which I employ consists of a conventional direct current meter with a bridge rectifier to measure the amplitude of the amplifier output. These features accordingly require no detailed description.

The probe 10 contains at least one winding, and for more useful sensitivity, two windings. When suitably energized by an exciting source 13, as by an alternating current of suitable voltage and frequency, a field will be set up about the probe 10. When the voltage in the probe winding or windings is suitably balanced, as by the means employed in the balancing unit 12 for the two windings used in this preferred embodiment, there will be no appreciable input to the vacuum tube amplifier 14, and the indicating means 15 will operate at a reference level. This reference level may be fixed at the zero point or at any other desired point on the meter scale by a suitable counterbalancing means. I obtain this result in practice by introducing to the meter a direct current of opposite polarity and of sufficient magnitude to give the desired reference level.

When the probe 10 is brought into the vicinity of a metallic particle, the reaction of the metallic particle with the field causes an alteration in the character of the field varying with the distance of the probe from the particle and the mass and the shape of the particle. This causes one or more changes in voltage, current, or phase in the probe winding or windings and since the original balance is thus disturbed, there occurs a further change in voltage across the input of the amplifier, which is measurable across the output of the amplifier 14 by any of the usual indicating means, such as the meter to which I have referred. The indicating means will show a value above the reference level proportionate to the distance of the metallic particle from the probe, and also proportionate to the shape and mass of the particle. The needle deflection will accordingly increase as the probe is brought nearer to the metallic particle, and decrease as the probe is drawn away from it, so that the location of the particle may be determined.

The probe contains at least one winding 21, preferably wound about a core 20 of magnetically susceptible material, such as soft iron, for lower frequencies, such as I use in this instance. Preferably I make use of two windings 21 and 22 on such a core 20 for greater sensitivity. I also include a third winding 23, which I term a phasing winding, the purpose of which I shall presently explain. The leads from these three windings terminate on a terminal block 16, to which is attached the multi-conductor cable 11. The cable 11 serves to connect the probe to the balancing unit 12, the exciting source 13, the amplifier 14, and the indicating means 15.

The balancing unit is an electrical counterpart of the probe unit, and will therefore have the same number of windings as the probe. In the construction being described, the balancing unit contains three windings 31, 32, and 33 corresponding, respectively, to windings 21, 22, and 23 of the probe and wound on a core member 30 which corresponds mechanically and electrically to probe core 20. Corresponding windings 21 and 31 are treated as primaries of identical transformers, and are connected in series to the exciting current source 13.

In the use of the apparatus described, I employ a low voltage, low frequency source of alternating current, which I may obtain from a filament winding of the filament transformer of the amplifier 14. I prefer to use a low voltage because of the lessened possibility of insulation breakdown or by-pass, when the probe is in use, and I thereby reduce the risk of consequent accidental shock to the patient. The frequency of the current is not particularly critical, except that the design is influenced by increasing frequency considerations, such as, for instance, in the elimination of magnetic cores. I have preferred to develop this embodiment on the basis of using a low frequency alternating current because such a current is almost universally obtainable without difficulty, and its use simplifies constructional details.

If the only current available is direct current, a suitable exciting current can be obtained by the use of a local oscillator in conjunction with the amplifier, or by using an appropriate inverter. A vibrator or motor driven interrupter may also be employed to obtain an intermittent current for use as the energizing source 13 for the probe windings. I therefore do not wish to be limited to the type of current or the frequency of the current that produces the field surrounding my probe.

Corresponding windings 22 and 32 of the probe and balancing unit are treated as secondaries of identical transformers, and upon application of the energizing source 13 to the primaries 21 and 31, a voltage will be induced in each secondary. However, windings 22 and 32, while connected in series, are in opposition and 180 degrees out of phase, so that there is substantially a complete elimination of the induced voltages. No appreciable current will therefore flow in the load, which is the input resistance of the amplifier connected in series with the secondaries 22 and 32.

From the foregoing, it will be apparent that as soon as the windings are energized, a field will be set up about the probe, but while that field is undisturbed, no appreciable current will flow in the input circuit of the amplifier. However, the presence of a metal within the range of the probe field will alter the character of the field, so that the original balance will be upset, and the degree of unbalance, which depends upon the distance of the probe from the metal and the shape and mass of the metal, will determine the increased voltage that will be impressed across the input load of the amplifier 14 and the corresponding increase in current that will flow through the amplifier.

In actual practice, it is economically difficult to produce identical transformers to such close tolerances that the secondaries can be completely opposed without additional means. I, therefore, include a third winding 23 or 33 in either transformer, and I shunt such winding with a load, which may be either resistive, as indicated at 17 and 18, or capacitive and is variable, so that I can vary the load upon the particular transformer at will. This arrangement permits me to alter the phase of the induced voltage, and to a lesser degree, the amplitude of the induced voltage, in the particular secondary, as I find necessary. Although only one such third winding so loaded is required on either of the transformers for the specified purpose, I prefer, for greater ease of adjustment, to include such a winding with each transformer. I adjust these variable loads to balance the opposing voltages in the secondaries, and then I measure the value of one and replace it with a fixed resistor of such value that the balanced condition is obtained when the variable resistor is set for its mean value. This arrangement makes it possible to adjust the balancing unit so that other factors encountered in practice can be readily overcome.

The third winding with its variable load may be referred to as a phase control and it is used to determine the nature of the metallic particle, since ferrous and non-ferrous metals have different effects upon the probe field. A particle of ferrous metal within the range of the field decreases the reluctance of the magnetic circuit, permitting a larger number of flux linkages through the probe winding or windings and thus creating a measurable voltage difference. A particle of non-ferrous metal within the range of the field has eddy currents induced in it and these currents react with the field to produce partial demagnetization, as well as phase shift, so that a measurable voltage difference results. By suitable adjustment of the variable phasing control 17 or 18, it is possible to adjust for maximum sensitivity for the particular suspected metal.

The location of the particle is made by exploring along cross lines to fix its position by intersection. I find it desirable to attach to the tip of the probe a marker means, which may be removable, if desired, so that the proper point of incision may be indicated on the skin surface. The marker may then be detached for further exploration in an incision or wound.

In the modified construction shown in Fig. 7, there is only one winding on the probe and a core may be used or not, depending upon the frequency. The probe winding, designated 21 in Fig. 6, is connected in series with an external balancing winding 31, serving as a balancing unit 12, and an exciting current is led from source 13 through the windings 21 and 31. The amplifier input is taken from the junction of windings 21 and 31 and from a point of corresponding potential difference, which is obtained by a potentiometer 19 connected across the source 13 of exciting current. By adjusting the potentiometer, any desired reference level on indicating means 15 can be obtained. As the self-induced voltages in the two windings may be out of phase with one another, a phasing means similar to that already described is employed to obtain further balance.

The probe, as illustrated in Figs. 2, 3, and 4, includes a shell 40 of relatively small cross-section and smooth outer surface without sharp edges, as shown. The shell contains the core element 20, the several windings, the terminal block 16, and the end of the cable. The shell is preferably of non-magnetic material, and brass, protected against corrosion as by chromium plating, enameling, or like treatment, is satisfactory, since it may be subjected to the usual sterilization treatment without damage. Other materials, however, may be employed for the shell, such as plastics of appropriate characteristics. The shell is of decreasing diameter toward its free end, so that it can be readily inserted into an incision or other orifice for exploration and it is sufficiently long to provide a handle portion which may be easily grasped by the surgeon.

A cap 42 is mounted on the rear end of shell 40 to close it and hold the core in place and the cable 11 enters the shell through an aperture in the cap. The shell 40 and cap 42 are threaded together, as indicated at 41, and the cap is provided with an annular recess 43 which may receive fastening means for holding in place a sterile sleeve for probe 10 or cable 11, when such a sleeve is used.

The core 20 is relatively long and conforms generally to the interior conformation of shell 40. The core has an end portion upon which windings 21, 22, and 23 are wound and it also has a central hollow portion in which a terminal block 16 is mounted. The internal diameter of the shell is slightly greater than the external diameter of the windings and the hollow portion of the core, as illustrated, so that the shell may be sprung to a considerable degree while in use without applying a bending force to the core either directly or through the windings. Bending of the core would result in a change in its permeability and this would upset the balance of the instrument and introduce errors in indication. Such errors are avoided by providing the clearance between the shell and the windings and the core of the windings as described, and also by tapering and thereby stiffening the end portion of the core on which the windings are mounted.

Windows 50 are provided in the core member 20 so that the terminal block is readily accessible for soldering the leads from the windings when the shell is removed. Openings 52 are formed in the core beyond the windings and lead from the outside of the core to the central hollow space. Bushings 44 of insulating material are mounted in openings 52 and through these bushings are drawn the leads from the windings to fasten them to the terminals of terminal block 16. The block is held in place in core member 20 by means of three small projections 16a which fit into corresponding openings 51 in core member 20. The windings 21, 22, and 23 are placed on the forward part of core member 20 between two insulating washers 45 and 46, and the rear washer 46 has openings 47 through which the leads to the windings are drawn. The openings 47 are aligned with the bushings 44 through which the lead wires also pass. The washers 45 and 46 also serve to hold the internal unit of my probe in position within the shell.

More or less variation of the exact details of construction is permissible without departing from the spirit of my invention. I desire therefore not to be limited to the exact form of construction and connection as shown and described, but rather by the appended claims in which I define all of my invention and my contribution to the art.

I hereby claim as new and desire to secure by Letters Patent:

1. A surgical instrument which comprises a shell having an elongated portion of the size and shape of a surgical probe, said portion having a closed end and a smooth outer surface, a core extending longitudinally within said portion of the shell, a primary and secondary winding in inductive relation on the core, said windings having their axes extending longitudinally of said portion of the shell, means supporting the core and windings within said portion of the shell, and a cable entering the shell and containing conductors connected to the terminals of the windings.

2. A surgical instrument which comprises a shell having an elongated portion of the size and shape of a surgical probe, said portion having a closed end and a smooth outer surface, a core extending longitudinally within said portion of the shell, a primary and a secondary winding in inductive relation on the core, said windings having their axes extending longitudinally of said portion of the shell, means supporting the core and windings within said portion of the shell in spaced relation thereto, and a cable entering the shell and containing conductors connected to the terminals of the windings.

3. A surgical instrument which comprises an elongated shell of the size and shape of a surgical probe, said shell having a closed end and a smooth outer surface, a core extending longitudinally within said portion of the shell, a primary and a secondary winding in inductive relation on the core, said windings having their axes extending longitudinally of said portion of the shell, means supporting the core and windings within the shell, removable means for closing the other end of the shell, and a cable entering the shell through said removable means and containing conductors connected to the terminals of the windings.

4. A surgical instrument which comprises a shell having an elongated portion of the size and shape of a surgical probe, said portion having a closed end and a smooth outer surface, a core extending longitudinally within said portion of the shell, a primary and a secondary winding in inductive relation on the core, said windings having their axes extending longitudinally of said portion of the shell, means supporting the core and windings within said portion of the shell, a terminal block within the shell having terminals connected to the terminals of the windings, and a cable entering the shell and containing conductors connected to the terminals on the terminal block.

5. A surgical instrument which comprises a shell having an elongated portion of the size and shape of a surgical probe, said portion tapering to a closed end and having a smooth outer surface, a core extending longitudinally within said portion of the shell and having a taper corresponding generally to that of said portion of the shell, a primary and a secondary winding in inductive relation on the core, said windings having their axes extending longitudinally of said portion of the shell, means supporting the core and windings within said portion of the shell, and a cable entering the shell and containing conductors connected to the terminals of the windings.

6. A surgical instrument which comprises a shell having an elongated portion of the size and shape of a surgical probe, said portion having a closed end and a smooth outer surface, a core extending longitudinally within said portion of the shell and having a longitudinally extending passageway therein, a primary and a secondary winding in inductive relation on the core, said windings having their axes extending longitudinally of said portion of the shell, an opening in the core leading from said passageway to the space within said portion of the shell, the leads from the windings passing through said opening into the passageway within the core, means supporting the core and windings within said portion of the shell, and a cable entering the shell and containing conductors connected to the winding leads.

7. A surgical instrument which comprises a shell having an elongated portion of the size and shape of a surgical probe, said portion having a closed end and a smooth outer surface, a core extending longitudinally within said portion of the shell, a portion of said core being hollow, a primary and a secondary winding in inductive relation on the core, said windings having their axes extending longitudinally of said portion of the shell, means supporting the core and windings within said portion of the shell, a terminal block within the hollow portion of the core having terminals thereon, an opening in the core leading from the outside thereof to the space therewithin, the leads from the windings passing through said opening and being connected to the terminals on the terminal block, and a cable entering the shell and containing conductors connected to the terminals on the terminal block.

8. A surgical instrument which comprises a shell having an elongated portion of the size and shape of a surgical probe, said portion having a closed end and a smooth outer surface, a core extending longitudinally within said portion of the shell, a primary and a secondary winding in inductive relation on the core, a third winding on the core, said windings having their axes extending longitudinally of said portion of the shell, means supporting the core and windings within said portion of the shell, a cable entering the shell and having conductors connected to the terminals of the respective windings, and a lead connected through the conductors across the terminals of the third winding.

9. A surgical instrument which comprises a shell having an elongated portion of the size and shape of a surgical probe, said portion having a closed end and a smooth outer surface, a core extending longitudinally within said portion of the shell, a primary and a secondary winding in inductive relation on the core, a third winding on the core, said windings having their axes extending longitudinally of said portion of the shell, means supporting the core and windings within said portion of the shell, a second core outside of said portion of the shell, a primary and a secondary winding in inductive relation on said second core, the primaries of the two sets being connected in series and the secondaries of the two sets being connected in series but in opposition, a third winding on the second core, and loads across the third windings of the two sets, at least one of the loads being variable.

SAMUEL BERMAN.